United States Patent [19]
Hugon

[11] Patent Number: 5,456,008
[45] Date of Patent: Oct. 10, 1995

[54] PROCESS FOR HARD-COATING A BALL

[75] Inventor: Jean-Claude Hugon, Pannessieres, France

[73] Assignee: Sarma, Saint-Vallier, France

[21] Appl. No.: 206,822

[22] Filed: Mar. 7, 1994

[30] Foreign Application Priority Data

Mar. 11, 1993 [FR] France .................................. 93 03050

[51] Int. Cl.⁶ ........................................................ B23P 9/00
[52] U.S. Cl. ............................. 29/898.069; 29/898.12; 29/898.13; 29/898.14; 29/899; 29/527.4; 29/530; 29/898.052; 384/491
[58] Field of Search ................ 29/898.069, 898.12, 29/898.13, 898.14, 899, 898.042, 898.043, 898.052, 898.04, 898.06, 424, 527.2, 527.4, 530; 384/491, 492, 912; 427/2.26, 2.27

[56] References Cited

U.S. PATENT DOCUMENTS

| | | | |
|---|---|---|---|
| 2,478,056 | 8/1949 | Reeg | 29/898.043 |
| 2,973,227 | 2/1961 | Glavan | 29/898.13 |
| 3,248,788 | 5/1966 | Goldstein et al. | 29/527.2 |
| 3,654,683 | 4/1972 | White | 29/424 |
| 3,727,280 | 4/1973 | Campbell | 29/898.052 |
| 3,786,543 | 1/1974 | Sato | 29/424 |
| 4,005,514 | 2/1977 | McClosky | 29/898.043 |
| 4,090,283 | 5/1978 | Woolley | 29/527.4 |
| 4,172,155 | 10/1979 | Pease | 29/527.2 |
| 4,251,122 | 2/1981 | McClosky | 29/898.043 |
| 4,523,365 | 6/1985 | Richmond | 29/527.2 |

*Primary Examiner*—David P. Bryant
*Attorney, Agent, or Firm*—Dowell & Dowell

[57] ABSTRACT

This invention relates to a process for hard-coating a ball, consisting in:

- hollowing in the outer surface of the ball a depression whose periphery lies at a certain distance from the two polar faces of the ball in order that it is bordered by elevated zones;
- coating the whole of the spherical outer surface with a layer of hard matter;
- and machining the layer over a depth such that this layer disappears completely on the elevated zones and remains only in the depression.

The invention also relates to a ball employed in this process.

4 Claims, 2 Drawing Sheets

PROCESS FOR HARD-COATING A BALL

FIELD OF THE INVENTION

The present invention relates to coatings applied to a ball intended to cooperate with an outer ring provided with an anti-friction coating such as for example polytetrafluoroethylene.

BACKGROUND OF THE INVENTION

Such ball-joint assemblies have been employed for a long time in the aeronautical industry with a view to constituting links for connecting rods or other control members.

Up to the present time, as described in British Patent GB-2 170 279.B, an outer ring has been used, whose spherical concave surface is coated with polytetrafluoroethylene, whilst the ball which cooperates with the ring is coated with a thin layer of very hard matter such as tungsten carbide.

As the ball comprises two flattened poles, there are two sharp circular edges between the two flat portions and the spherical central part of the ball. As it is only this central part which is coated with a hard layer such as tungsten carbide, considerable irregularities or flakings frequently occur both during manufacture and during use of the pieces, at the level of the connection of the spherical central part and the two faces. Chipping of the hardened surface leads to the piece in question being discarded, as it is inacceptable to use it as such. Such discarding involves high dismantling and re-assembly costs particularly if the defects are produced during assembly of the articulation.

It is an object of the improvements forming the subject matter of the present invention to overcome these drawbacks and to enable a ball with two flattened poles to be produced, which presents no risk of deterioration of the layer of matter added at the level of connection of this layer and the lateral faces of the ball.

SUMMARY OF THE INVENTION

According to the invention, the process of coating consists in:

hollowing in the outer surface of the ball a depression whose periphery lies at a certain distance from the two polar faces of the ball in order that it is bordered by elevated zones;

coating the whole of the spherical outer surface with a layer of hard matter;

and machining the layer over a depth such that this layer disappears completely on the elevated zones and remains only in the depression.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
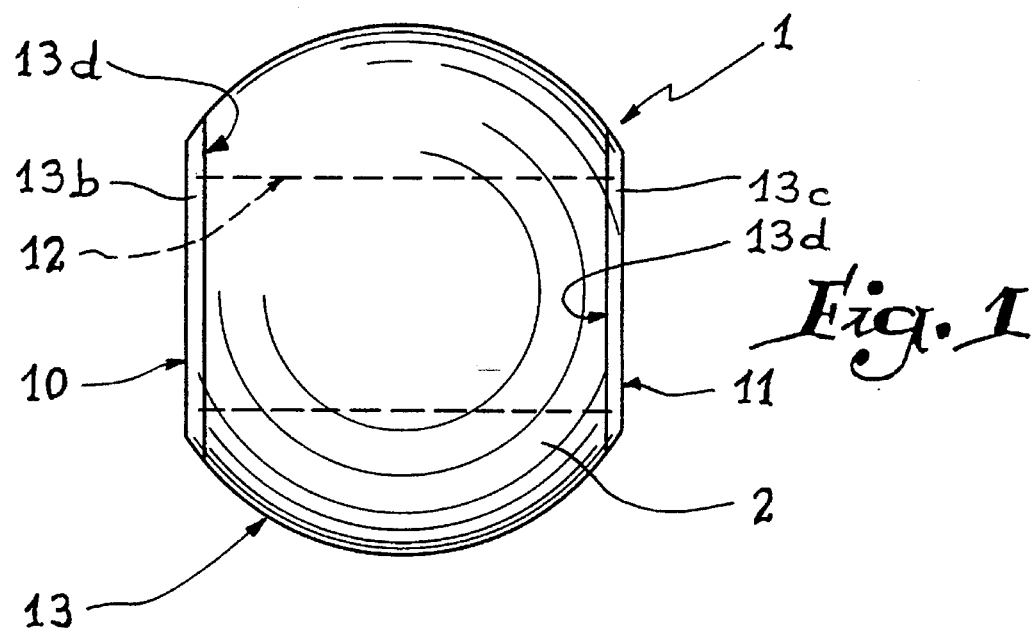
Figure 1 is a side view of a ball with two flattened poles made in accordance with the process according to the invention.
Figure 2:
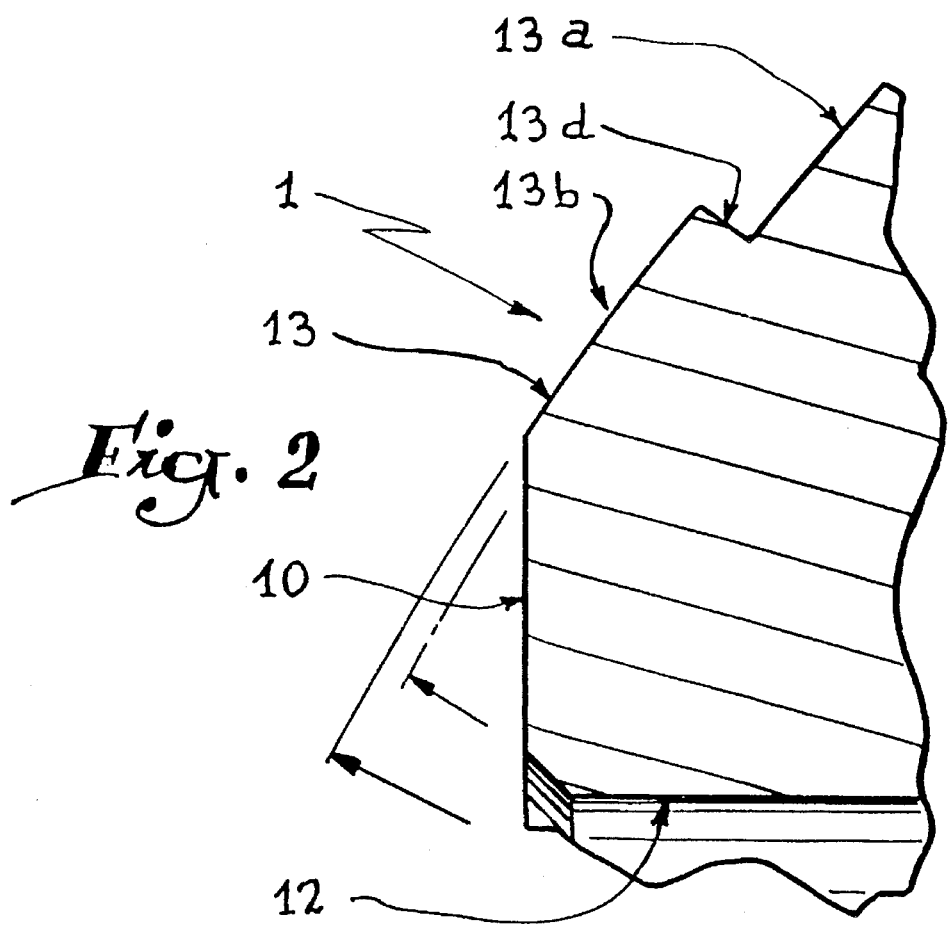
FIG. 2 is an enlarged partial view thereof illustrating the manner in which the spherical part of the ball is machined before receiving a hard coating.

Referring now to the drawings, FIG. 1 illustrates a ball 1 in the form of a sphere of which two diametrally opposite poles are flattened to constitute two parallel faces 10, 11. In the geometrical axis of these faces is made a transverse bore 12 with which is associated the member intended to receive the ball.

According to the invention, the spherical part 13 of the ball 1 comprises a central depression 13a whose periphery lies at a short distance from the two faces 10, 11 so that the bottom of this depression is bordered by two elevated zones 13b, 13c determining with this bottom a shoulder such as 13d.

Figure 3:
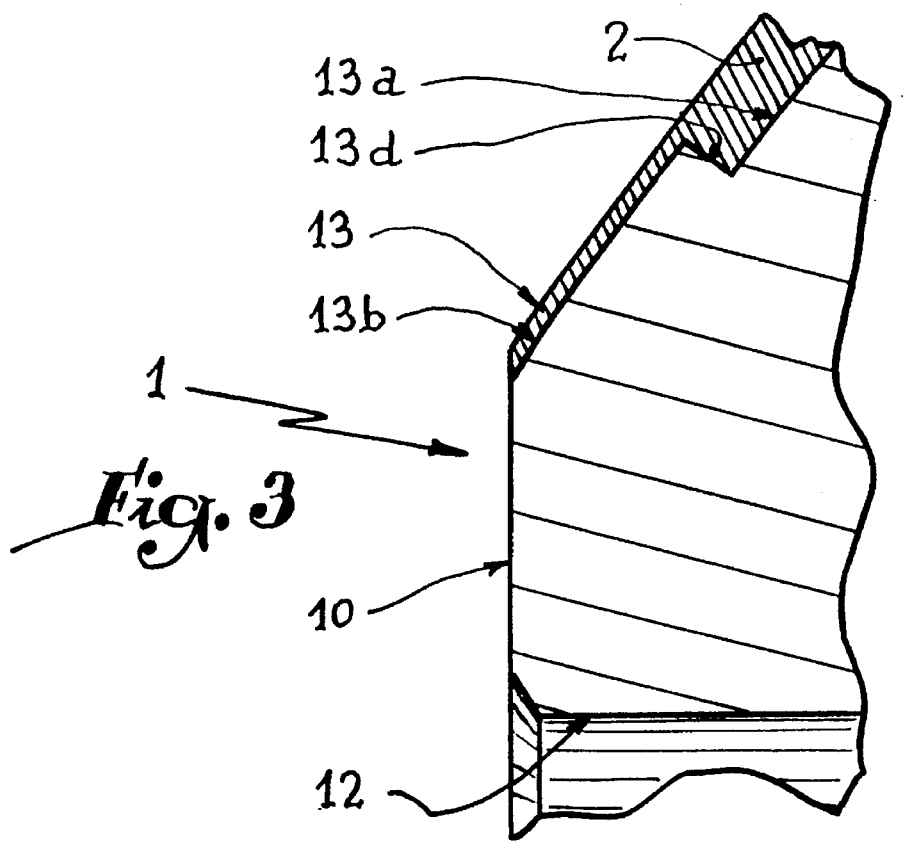
FIG. 3 is a view similar to that of FIG. 2, but corresponding to the phase of overall coating of the spherical face of the ball.
Figure 4:
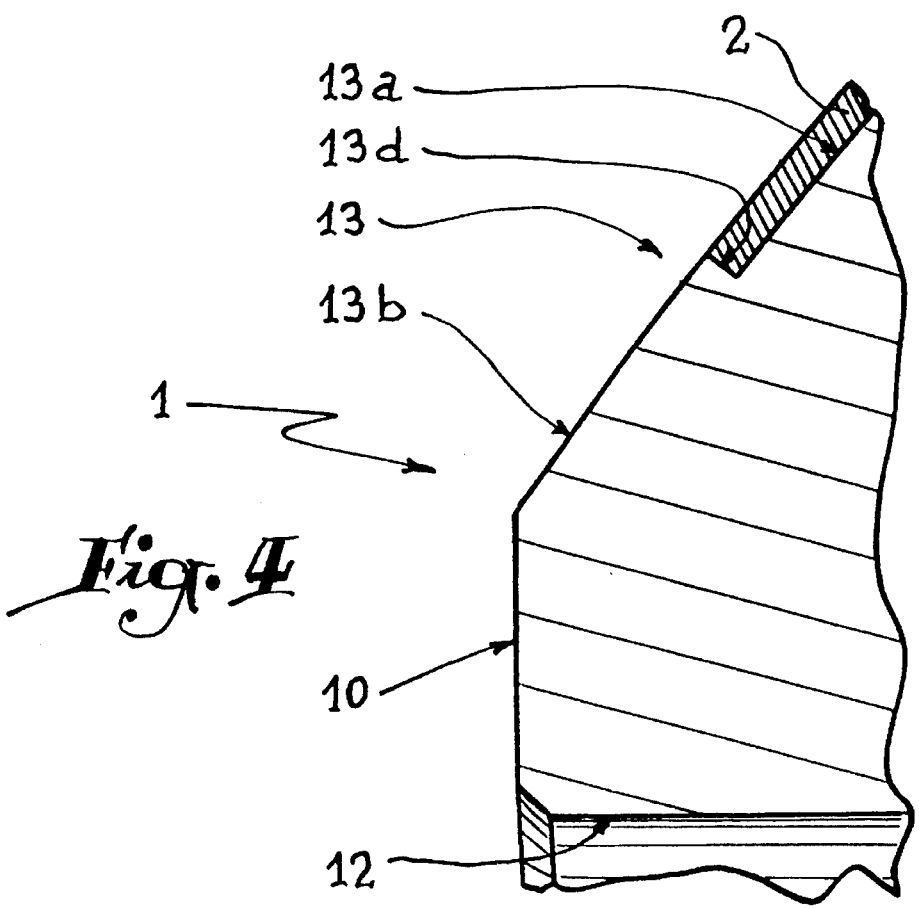
FIG. 4 is a detailed view similar to that of FIG. 3, but illustrating the spherical part of the ball in the finished state.

Over the whole surface of the spherical part 13 of the ball, a layer of hard matter 2 is deposited so that this layer is deposited in the depression 13a as well as on the two zones 13b, 13c, as illustrated in FIG. 3. The depth of the depression 13a being of the order of 0.05 millimeter, it is provided that the thickness of the layer 2 be thicker than this depth of said depression, viz. of the order of 0.075 to 0.1 millimeter about, so that the two zones 13b and 13c receive a thickness of hard matter 2 of the order of 0.05 to 0.15 millimeter. The hard matter 2 is preferably, although not exclusively, constituted by tungsten carbide with a hardness at least equal to 1000 Vickers.

The last phase of the process according to the invention consists in precision-grinding the overall spherical surface of the layer 2 until this layer disappears completely above the elevated zones 13b and 13c which, bared, lie exactly on the same sphere as the outer face of the layer 2 disposed solely in the depression 13a.

In this way, the limits of the layer 2 are protected by the shoulder 13d constituted by the join of the depression 13a and the zones 13b, 13c so that there is no longer any risk of flaking or chipping of the limits of the layer 2 during the assembly operations.

It must, moreover, be understood that the foregoing description has been given only by way of example and that it in no way limits the domain of the invention which would not be exceeded by replacing the details of execution by any other equivalents.

What is claimed is:

1. Process for hard-coating a ball having two flat polar faces, said process comprising:

hollowing in the outer surface of the ball intermediate the polar faces a depression which is bound by an elevated surface adjacent each polar face, each of said elevated surfaces extending around the entire periphery of its adjacent polar face;

coating the depression and the elevated surfaces with a layer of hard matter; and machining the layer of hard matter such that the layer is removed completely from the elevated surfaces and remains only in the depression.

2. The hard-coating process of claim 1, wherein the layer of hard matter exhibits a hardness of at least 1000 Vickers.

3. The hard-coating process of claim 1, wherein the depth of the depression is approximately 0.05 millimeter, and the thickness of the layer of hard matter in the depression is approximately 0.075–0.1 millimeter before the machining step.

4. The hard-coating process of claim 1, wherein the hard matter is tungsten carbide.

* * * * *